UNITED STATES PATENT OFFICE.

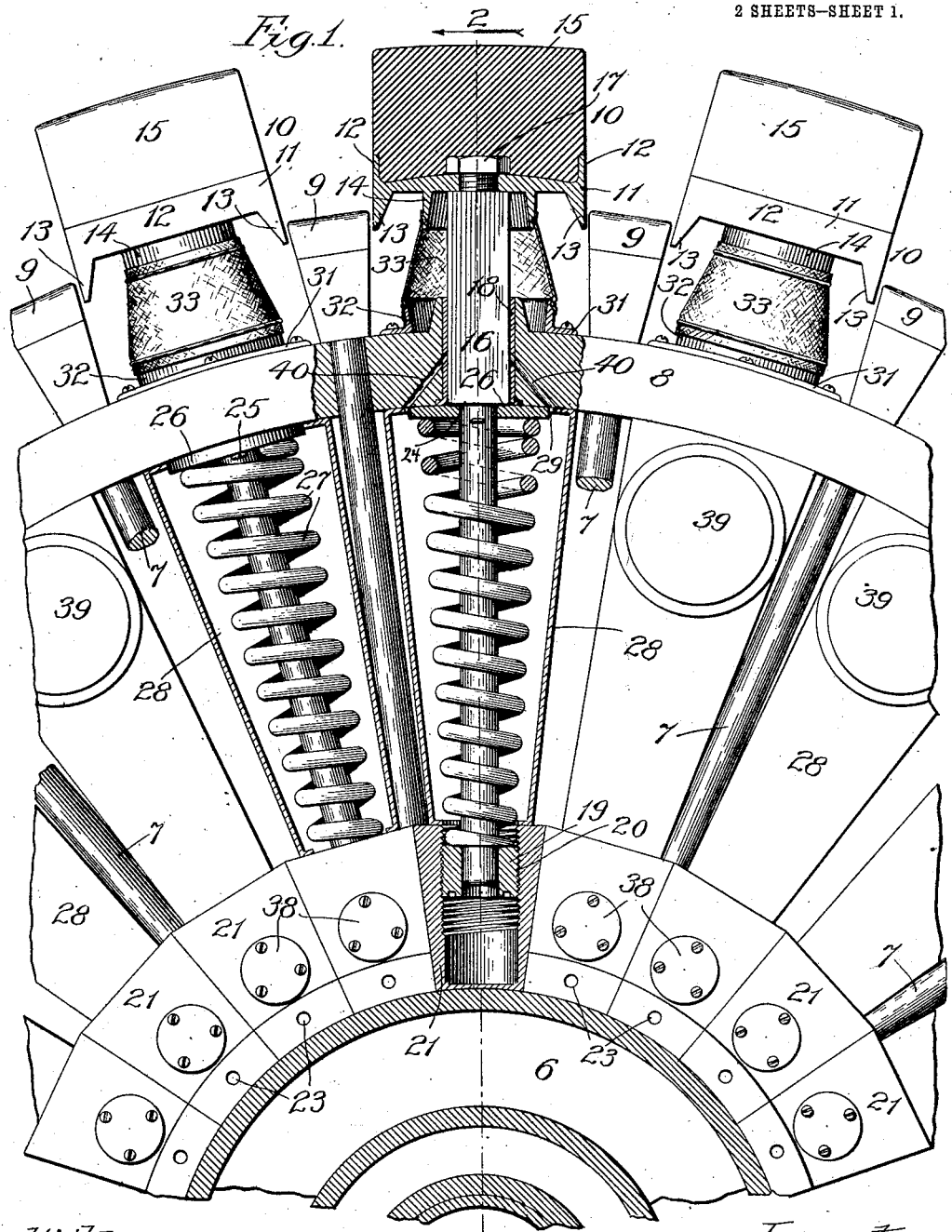

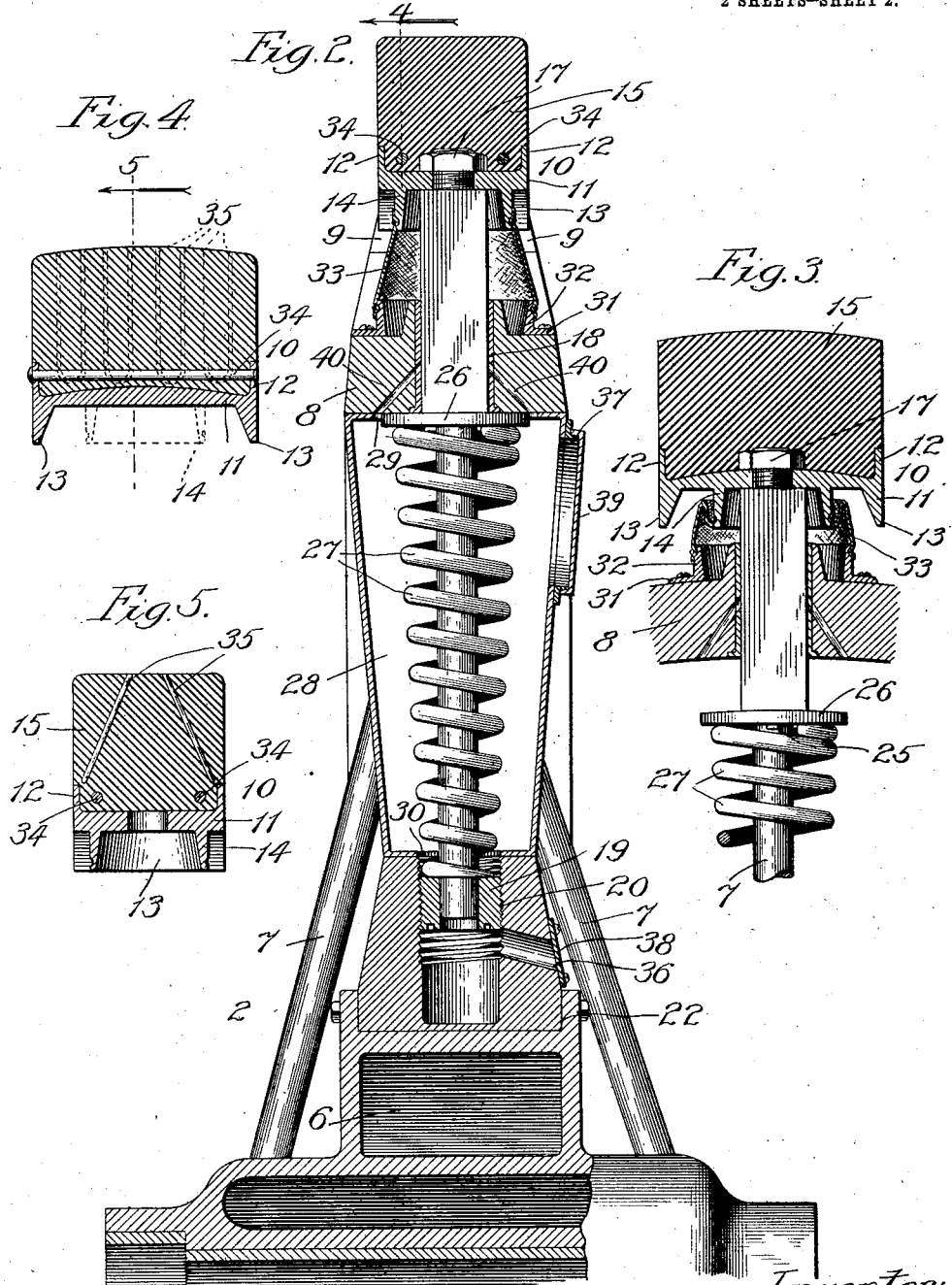

EDWARD A. GLENN, OF CHICAGO, ILLINOIS.

VEHICLE-WHEEL.

1,021,459.          Specification of Letters Patent.      Patented Mar. 26, 1912.

Application filed January 20, 1908, Serial No. 411,697. Renewed August 11, 1911. Serial No. 643,639.

*To all whom it may concern:*

Be it known that I, EDWARD A. GLENN, a citizen of the United States, residing at Chicago, in the county of Cook and State of Illinois, have invented a new and useful Improvement in Vehicle-Wheels, of which the following is a specification.

My invention relates, more particularly, to an improvement in wheels for automobiles; and my primary object is to provide a wheel which shall possess the excellent qualities of a wheel equipped with a pneumatic tire when in relatively soft condition, but which shall not be subject to the disadvantages of a wheel so equipped, whereby the wheel will serve to effectually prevent, to a great degree, transmission of vibration to the vehicle-body and still not be subject to impairment of its tread by puncture.

Referring to the accompanying drawings—Figure 1 shows by a view in side elevation, and partly in section, a segment of a wheel constructed in accordance with my invention, one of the radial tread-members and its mechanism being shown in section, another of the tread-members being shown in elevation with its casing in section, and the other tread-members being shown in elevation with their casings likewise in elevation; Fig. 2 is an enlarged section taken at the line 2 on Fig. 1 and viewed in the direction of the arrow; Fig. 3 is a section similar to that of Fig. 2 showing a tread-member in depressed condition; Fig. 4 is a section taken at line 4 on Fig. 2 and viewed in the direction of the arrow; and Fig. 5 is a section taken at the line 5 on Fig. 4 and viewed in the direction of the arrow.

The hub of the wheel, which in the construction shown is of metal, is represented at 6 and has radially extended from it, in staggered relation to each other, spokes 7. The spokes extend through and are fastened at their outer ends in a ring 8 which forms a felly, the parts thus described constituting the wheel proper. The outer ends of the spokes preferably have pads 9 of resilient material, such as rubber, or any other suitable material, fastened at their extreme outer ends, thus forming fillers between the tread-sections hereinafter described. The tread-proper of the wheel consists of spaced tread-sections 10 preferably spaced equi-distant apart and alternating with the spokes as represented.

Each of the sections 10 comprises a base 11 preferably of metal provided on its upper side with a continuous flange 12, a depending flange 13 at each end, an annular flange 14 located between the flanges 13, and a pad 15 preferably of resilient material, as for instance rubber, seated on the outer face of the base 11 between the flanges 12, each section 10 being rigidly secured to the outer end of a rod 16, as by a nut 17. The rods 16, which alternate with the spokes and extend radially from the hub, are slidably confined near their outer enlarged ends in preferably square bearings 18 in the felly 8, and at their inner reduced ends in sleeves 19 adjustably connected, as through threaded engagement as represented, with the threaded bores 20 of an annular series of tapering blocks 21 which are held in place in a channel 22 provided in the outer periphery of the hub 6, as by bolts 23 passing transversely through them and the circumferential walls of the channel 22. Each rod 16 contains a shoulder 24 formed by the reduction of the diameter of the rods at their inner ends, and fastened on the reduced portion of each rod against its shoulder 24, as by a cotter-pin 25 passing transversely through the rod, is a washer 26, between which and the outer circumference of the sleeve 19 through which its lower end extends, a spring 27 surrounding the rod is confined. Each rod 16 and its mechanism interposed between the blocks and felly as described, is enveloped by a casing or housing 28 which contains openings 29 and 30 at its opposite ends for permitting movements of the parts as hereinafter described.

Fastened on the outer periphery of the felly 8, to surround the openings contained therein and through which the rods reciprocate, and suitably spaced therefrom, is a casting 31 having an annular outwardly extending flange 32, preferably of greater diameter than the ring 14, and fastened at its end-portions to the flange 32 and ring 14, to span the space between them, is a continuous strip 33 of preferably frusto-conical shape and formed of flexible material, such as leather or any other suitable material, these continuous strips completing the housings of the outer ends of the rods 16. The pads 15, forming the traction-surfaces, may be secured to the bases 11 in any suitable manner. In the construction shown, each one of the pads is fastened in place by two bolts 34 passing transversely through the pad and opposed portions of the flange 12. To assist in resisting wear of the pads 15 and to increase traction of the wheel, I prefer to provide in each pad metal loops 35 of U-shape preferably arranged in the tapering relation shown in Fig. 5, with their free ends extending away from the base 11 and terminating at the outer surfaces of the pads.

The operation of the wheel, when in use, is as follows: The weight of the vehicle to which it is applied, as the tread-sections 10 are successively rotated into engagement with the pavement, causes the tread-sections with their rods 16 to be depressed in a direction toward the hub 6 and against the resistance of the springs 27, thereby preventing, in a great degree, the setting up of vibrations in the vehicle-axles and the vehicle-body, and consequently preventing jarring of the vehicle. Furthermore, the provision of the tread-sections with their cushioning means serves to exhance traction by causing tread-sections to be in constant contact with the pavement during the propulsion of the vehicle. The housing 33 folds upon itself, as indicated in Fig. 3, when the rods are depressed, and thus serves to prevent access to the bearings of dust, dirt, water or other injurious substances that might be encountered by the wheel.

The lubrication of the parts of the wheel described may be effected by introduction into the bores in the blocks 21, and into the casings 28 through openings 36 and 37, respectively, provided with closures 38 and 39, of lubricants, such as graphite mixed with grease, which works its way into complete contact with the sliding parts of the mechanism. If desired, to augment the spreading of the lubricant, by-passes 40 may be provided in the felly 8 communicating the interior of the casings 28 with the bearing-portions of the sleeves 18, whereby the lubricant is driven through them by centrifugal force under the action of the rotating wheel.

The outer ends of the spokes 7, which I prefer shall protrude beyond the felly 8 to a distance less than that to which the surfaces of the pads 15 extend when depressed, as described, and shall extend beyond the lower ends of the flanges 13 on the sections 10 when the latter are extended as represented in Fig. 1, serve to prevent the wedging of boards and stones or any other obstacle between the rods 16, and thus prevent the bending of the rods from this cause.

A wheel constructed in accordance with my invention is not only strong and durable and capable of resisting, to a high degree, any tendency to excessive vibration of the vehicle equipped with it, but it also lessens liability of skidding of the vehicle, and increases its traction power on slippery and stony pavements, as its tread is made up of tread-sections, two or more of which are always in contact with the pavement. Furthermore, its action upon the pavement is such as to very materially reduce wear of the pavement and the raising of dust.

What I claim as new, and desire to secure by Letters Patent, is—

1. A vehicle-wheel comprising a hub, a felly joined thereto by spokes, radially-extending yieldingly-supported rods projecting beyond the felly and provided with tread-portions, flanges on the outer circumference of the felly surrounding each of said rods, flanges on the under sides of the tread-portions surrounding the rods, said flanges being of different diameters and adapted to telescope with each other, and flexible housings connecting the flanges on the tread-sections with the flanges on the felly.

2. A vehicle-wheel comprising a hub, a felly joined thereto by spokes, radially-extending yieldingly-supported rods projecting beyond the felly and provided with tread-portions, flanges on the outer circumference of the felly surrounding said rods, flanges of less diameter than said first-named flanges on the under sides of the tread-portions surrounding the rods, said flanges being adapted to telescope with each other, and flexible housings of frusto-conical shape connecting the flanges on the tread-sections with the flanges on the felly.

3. A vehicle-wheel comprising in combination a hub and a ring-support joined thereto by spokes, fillers on the spokes extending beyond said support, radially-extending reciprocable rods mounted near their outer ends in said support to reciprocate therethrough and at their inner ends in said hub, to be guided thereby, stops on said rods, coil-springs surrounding said rods and confined between said stops and said hub, non-overlapping transversely-extending tread-sections secured to the outer ends of said rods to reciprocate in the spaces provided between said fillers, flanges provided on the outer circumference of said support to encircle said rods, depending flanges on the inner sides of said tread-sections, and housings of flexible material secured to the flanges on said tread-sections and support for encircling the rods on their outer ends, for the purpose set forth.

EDWARD A. GLENN.

In presence of—
A. U. THORIEN,
W. B. DAVIES.